Figure 1:
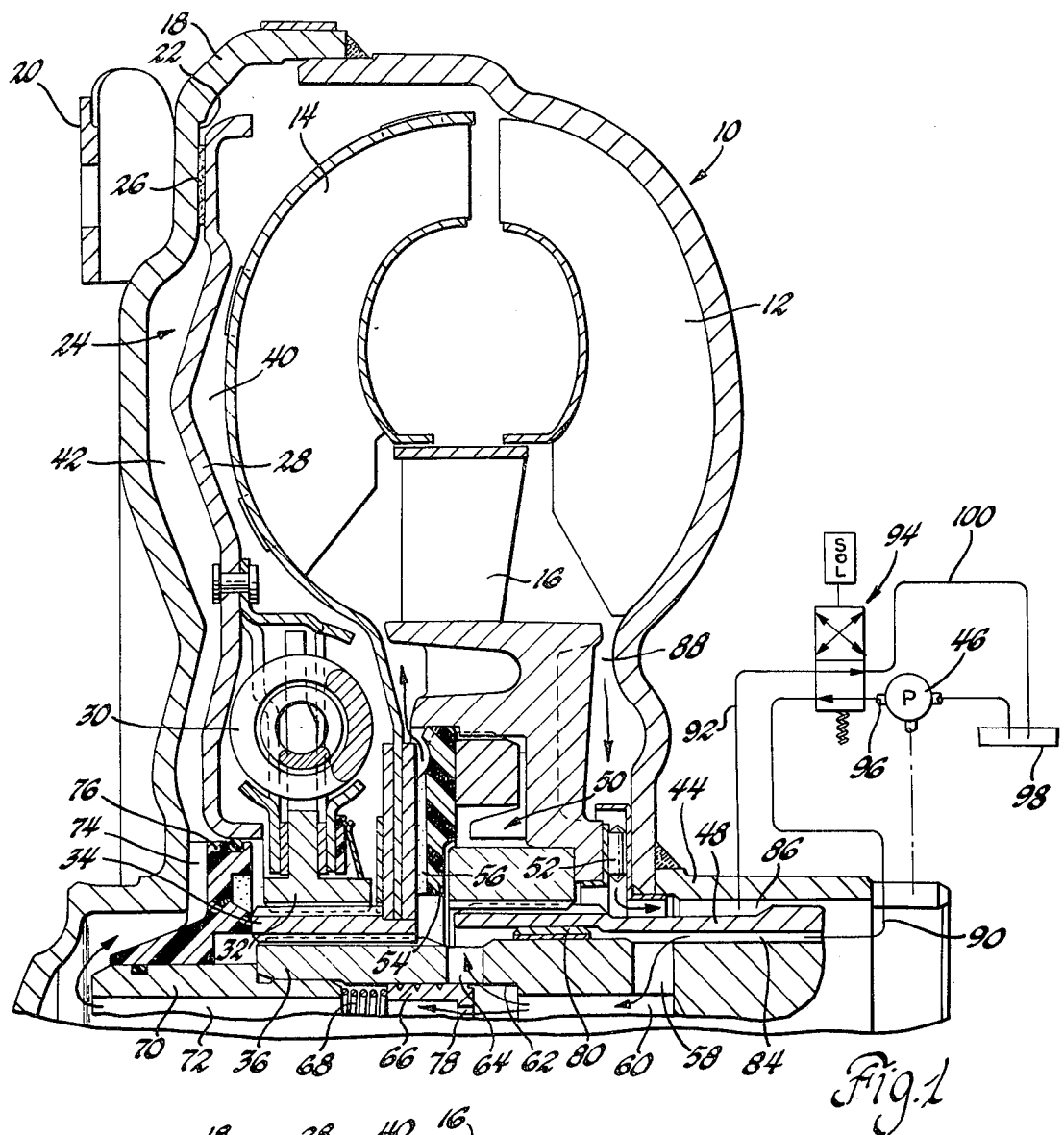

United States Patent [19]
Vukovich et al.

[11] 4,049,093
[45] Sept. 20, 1977

[54] TORQUE CONVERTER AND LOCK-UP CLUTCH WITH A FLOW DIVIDER VALVE

[75] Inventors: William J. Vukovich, Pittsfield Township; Paul D. Stevenson, Ann Arbor, both of Mich.

[73] Assignee: General Motors Corporation, Detroit, Mich.

[21] Appl. No.: 706,396

[22] Filed: July 19, 1976

[51] Int. Cl.² ............................................. F16H 45/02
[52] U.S. Cl. ...................................... 192/3.3; 60/347; 60/361
[58] Field of Search ........................ 192/3.29, 3.3, 3.33

[56] References Cited
U.S. PATENT DOCUMENTS

| | | | |
|---|---|---|---|
| 3,693,478 | 9/1972 | Malloy | 192/3.3 |
| 3,966,031 | 6/1976 | Peterson et al. | 192/3.3 |

*Primary Examiner*—Benjamin W. Wyche
*Attorney, Agent, or Firm*—Donald F. Scherer

[57] ABSTRACT

A torque converter and lock-up clutch wherein the fluid flow to and from the torque converter is directed into the converter, at an inner location, between the stator and turbine and to the disengagement of the clutch, when the clutch is disengaged. A control valve disposed in the turbine shaft divides the inlet flow. The fluid is exhausted from the converter between the stator and impeller. When the clutch is engaged, fluid flow is directed to the converter between the stator and impeller and the disengagement chamber of the clutch is exhausted. The control valve, during this phase, prevents fluid from exhausting between the stator and turbine.

2 Claims, 2 Drawing Figures

U.S. Patent  Sept. 20, 1977  4,049,093

TORQUE CONVERTER AND LOCK-UP CLUTCH WITH A FLOW DIVIDER VALVE

This invention relates to torque converter and lock-up clutch systems and more particularly to systems wherein fluid flow to and from the converter is controlled to thereby control the engagement and disengagement of the clutch.

The present invention is utilized in torque converter and lock-up clutch assemblies where it is desirable to use the converter feed flow and pressure to engage and disengage the lock-up clutch. It has been found that in operating such systems that when the torque converter fluid is fed to the torus circuit from the outer periphery of the torque converter there is a slight loss in efficiency of the torque converter. The present invention overcomes this disadvantage by directing fluid to the torque converter at an inner location, between the stator and turbine member and also to the clutch disengagement chamber when the clutch is to be disengaged and by directing fluid from the torque converter, at an inner location, between the impeller and stator. When the lock-up clutch is to be engaged, the torque coverter fluid is directed, at an inner location, between the impeller and stator and the clutch disengagement chamber is connected to exhaust. Thus, under both conditions of operation the torque converter is fed at an inner diameter which improves the efficiency of the unit.

It is an object of this invention to provide an improved torque converter and lock-up clutch assembly having a divider valve for controlling fluid flow to the torque converter during clutch disengagement.

Another object of this invention is to provide an improved torque converter and lock-up clutch assembly wherein a flow divider valve controls fluid flow to the disengagement chamber of the clutch and to the torque converter between the stator and the turbine during clutch disengagement and permits flow from the disengagement chamber while preventing flow from the torque converter between the stator and turbine during clutch engagement.

A further object of this invention is to provide an improved torque converter and lock-up clutch assembly wherein a flow divider valve is disposed in a passage formed in the turbine output shaft such that during clutch disengagement fluid flow is directed by the valve to the disengagement chamber of the clutch and to the torque converter and during engagement of the clutch the valve permits flow from the disengagement chamber and prevents flow directly from the torque converter.

Figure 2:
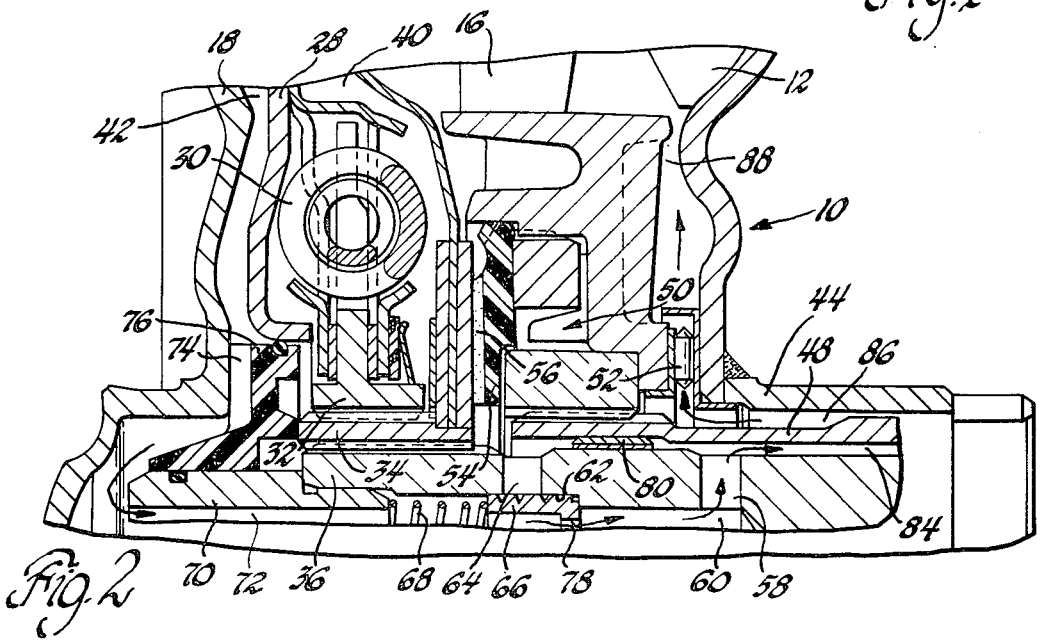

Other objects and advantages of the present invention will be more apparent from the following description and drawings wherein:

FIG. 1 is a cross sectional elevational view of a torque converter, lock-up clutch and control valve in one mode of operation; and FIG. 2 is a partial sectional view showing the control valve in a different mode of operation.

Referring to the drawings there is shown a conventional torque converter 10 having an impeller 12, a turbine 14 and a stator 16 disposed in conventional torus flow relation. The impeller 12 is secured to an input shell 18, which input shell 18 has secured thereto a drive lug 20 adapted to be connected to an internal combustion engine. The input shell 18 has a flat annular surface 22 which functions as a friction engaging surface for a lock-up clutch 24 which has secured thereto the friction pad 26 adapted to engage the surface 22.

The lock-up clutch is comprised of a pressure plate 28 to which is secured conventional torsional damper assembly 30 and an output hub 32. The output hub 32 is splined via a turbine hub 34 to a turbine output shaft 36. The turbine 14 is also secured to the turbine hub 34 and therefore to the turbine output shaft 36.

The pressure plate 28, turbine 14 and input shell 18 cooperate to form an engagement or apply chamber 40 between the turbine 14, the pressure plate 28, and a disengagement or release chamber 42 between the pressure plate 28 and the input shell 18. Chamber 42 can be selectively pressurized and exhausted to control the disengagement and engagement of the lock-up clutch 24.

The impeller 12 is secured to a pump drive shaft 44, which drives a conventional hydraulic pump 46, shown in schematic form. Thus, the pump 46 is operable whenever the engine is driving the impeller 12.

The stator 16 is of conventional construction and as is well known is connected to a stationary stator shaft 48 through a conventional one way device 50. The stator is spaced from the impeller by a roller bearing 52 and from the turbine 14 by a thrust washer 54. The thrust washer 54 has a plurality of radial slots 56 formed therein. The turbine shaft 36 has a radial passage 58 formed therein which is connected to an axial passage 60 which in turn is connected to an axial bore 62. The axial bore 62 is connected to a radial passage 64. The connection therebetween may be selectively opened and closed by an axially slidable valve 66 disposed in the bore 62. The valve 66 is urged in bore 62 toward the passage 60, to the closing position, by a coil spring 68. A shaft extension 70 is secured in the turbine shaft 36 and provides a grounding surface for the spring 68. The shaft extension 70 has an axial bore 72 which is in fluid communication with the bore 62 and through a plurality of radial passages 74, formed in a thrust washer 76, with the disengagement chamber 42 of clutch 24. The valve 66 is generally cup shaped and has formed in the end thereof an orifice or restriction 78 which permits controlled fluid communication between passage 60 and passage 72 via bore 62.

The turbine shaft 36 is rotatably supported in the stator shaft 48 by a bushing 80. The pump shaft 44 is rotatably supported in a pump housing, not shown, in a conventional manner. The turbine shaft 36 is sufficiently spaced from the stator shaft 48 to provide annular passage 84 which is in fluid communication with passage 58 and the stator shaft 48 is spaced from the pump shaft 48 a sufficient distance to provide an annular passage 86 which is in fluid communication with the space 88 between the stator 16 and impeller 12.

Annular passages 84 and 86 are in fluid communication with passages 90 and 92 respectively, which passages are shown in schematic form and are connected to a conventional solenoid operated two position four-way valve 94 shown in schematic form. The solenoid valve 94 is connected to the pump 46 through passage 96 and to the transmission reservoir, shown schematically at 98, through a passage 100. The solenoid vlve 94 is selectively, in any known manner, operable to control fluid flow from the pump 46 to the torque converter 10 either via passage 84 and 86 depending on the position of solenoid valve 94. In the position shown in FIG. 1, fluid flow is from pump 46 through passages 90 and 84, and from the torque converter via passages 86 and 92. In the solenoid set position of valve 94, the fluid from pump 46 is directed to the torque converter via passage 92 and 86, and from the torque converter via passages 84 and 90. This second flow situation is shown in FIG. 2.

In the position shown in FIG. 1 the fluid from pump 46 passes through passage 58 and passage 60 to the bore 62. Initially the valve 66 is in the spring set position so that all of the fluid flow must pass through restriction 78 to passage 72 and the disengagement chamber 42 of clutch 24 thus establishing disengagement of clutch 24. However, the restriction 78 is designed such that a small amount of flow through the restriction 78 will cause a sufficient pressure drop to permit the valve 56 to move against spring 68 to the position shown in FIG. 1 such that fluid flow is also directed through passage 64 and radial slots 56 to the torque converter 12 between the stator 16 and turbine 14. The majority of the fluid flow through the torque converter enters via this route. Any flow which exhausts from the torque converter passes between the stator 16 and impeller 12 to the passage 86 and returns to the reservoir 98. Thus the valve 66 effectively controls a minimum amount of fluid to disengage the clutch 24 and the remaining fluid is bypassed to the torque converter 10. This permits the torque converter to be fed primarily from the inner diameter while only a small amount of fluid will enter the torque converter between the impeller 12 and turbine 14 at the outer diameter. When it is desirable to engage the clutch 24, the solenoid valve 94 is energized thus directing the fluid flow as shown in FIG. 2 and described eariler. Under this condition fluid flow enters the torque converter between the impeller 12 and stator 16 and the disengagement in chamber 24 is connected to the exhaust through restriction 78 in valve 66. During this condition the valve 66 is pressure balanced whereby the spring 68 urges the valve 66 to the closed position shown in FIG. 2 such that fluid is not permitted to flow from the torque converter via passage 64. When the clutch 24 is engaged there is substantially no flow to or from torque converter and the pressure of the fluid in the torque converter operates in engagement chamber 40 to maintain the clutch 24 engaged.

Obviously, many modifications and variations are possible in light of the above teaching. It is, therefore, to be understood that within the scope of the appended claims the invention may be practiced otherwise than is specifically described.

What is claimed is:

1. A torque converter and lock-up clutch having a flow divider control valve comprising; a torque converter having an input shell adapted to be rotated by a prime mover, an impeller secured to said input shell, a turbine in fluid flow relation with said impeller and a stator disposed between said impeller and turbine; a friction clutch disposed between said turbine and said input shell and cooperating with said input shell to form a release chamber and with said turbine and input shell to form an apply chamber; an output shaft drivingly connected to said turbine and said friction clutch and having a fluid passage formed therein; first fluid path means for communicating fluid between said stator and said impeller to engage said clutch; second fluid flow path means for communicating fluid to said passage to release said clutch; and pressure differential responsive valve means disposed in said passage for dividing fluid flow between said release chamber and said torque converter wherein the fluid flow is introduced between said stator and said turbine when fluid flow is toward said release chamber and for permitting fluid flow from said release chamber when fluid is exhausted therefrom, said valve means including a restriction means for permitting a predetermined flow to said release chamber when the fluid flow is toward said release chamber before said valve means directs fluid flow to said torque converter between said stator and said turbine; and means for controlling fluid flow to and from said first and second fluid flow path means.

2. A torque converter and lock-up clutch having a flow divider control valve comprising; a torque coverter having an input shell adapted to be rotated by a prime mover, an impeller secured to said input shell, a turbine in fluid flow relation with said impeller and a stator disposed between said impeller and turbine; a friction clutch disposed between said turbine and said input shell and cooperating with said input shell to form a disengagement chamber and with said turbine and input shell to form an engagement chamber; an output shaft drivingly connected to said turbine and said friction clutch and having a fluid passage formed therein; first fluid path means for communicating fluid between said stator and said impeller; second fluid flow path means for communicating fluid to said passage in said output shaft; valve means disposed in said passage for directing fluid flow between said stator and said turbine when fluid flow is in one direction and for preventing fluid flow therebetween when fluid flow is in another direction, restriction means in said valve means for permitting a predetermined flow to said release chamber when the fluid flow is in said one direction before said valve means directs fluid flow between said stator and said turbine and for permitting exhausting of said release chamber when said fluid flow is in the other direction; and means for controlling fluid flow to said first and second fluid flow path means.

* * * * *